United States Patent
Luciani, Jr.

(10) Patent No.: US 12,019,752 B2
(45) Date of Patent: Jun. 25, 2024

(54) SECURITY DOMINION OF COMPUTING DEVICE

(71) Applicant: Hewlett Packard Enterprise Development LP, Houston, TX (US)

(72) Inventor: Luis E. Luciani, Jr., Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 105 days.

(21) Appl. No.: 17/495,562

(22) Filed: Oct. 6, 2021

(65) Prior Publication Data
US 2023/0106491 A1    Apr. 6, 2023

(51) Int. Cl.
| | |
|---|---|
| G06F 9/44 | (2018.01) |
| G06F 8/65 | (2018.01) |
| G06F 21/34 | (2013.01) |
| G06F 21/57 | (2013.01) |

(52) U.S. Cl.
CPC .............. G06F 21/572 (2013.01); G06F 8/65 (2013.01); G06F 21/34 (2013.01)

(58) Field of Classification Search
CPC ................................................... G06F 21/572
USPC ...................................................... 717/168
See application file for complete search history.

(56) References Cited

U.S. PATENT DOCUMENTS

| | | | |
|---|---|---|---|
| 7,299,354 B2 | 11/2007 | Khanna et al. | |
| 9,419,961 B2 * | 8/2016 | Chastain | ................. H04L 63/08 |
| 9,647,994 B2 * | 5/2017 | Bernheim | ................. H04L 9/14 |
| 9,967,102 B2 * | 5/2018 | Osborne | ............... H04L 9/0631 |
| 10,565,380 B2 | 2/2020 | Polak et al. | |
| 10,771,264 B2 | 9/2020 | Edwards et al. | |
| 11,508,382 B2 * | 11/2022 | Dunjic | .................... G06F 21/62 |
| 2015/0312250 A1 * | 10/2015 | Redberg | ................ H04L 63/083 |
| | | | 726/6 |
| 2018/0337776 A1 | 11/2018 | Miller et al. | |
| 2019/0164156 A1 | 5/2019 | Lindemann | |
| 2020/0051069 A1 * | 2/2020 | Wilson | ................ G06F 16/1834 |

(Continued)

FOREIGN PATENT DOCUMENTS

| | | | | |
|---|---|---|---|---|
| CN | 111046352 A | | 4/2020 | |
| CN | 111475782 A | * | 7/2020 | ........... G06F 21/121 |
| WO | WO-2022182341 A1 | * | 9/2022 | |

OTHER PUBLICATIONS

Islam et al., "Remote Configuration of Integrated Circuit Features and Firmware Management via Smart Contract", IEEE International Conference on Blockchain (Blockchain), 2019, pp. 325-331.

(Continued)

*Primary Examiner* — Evral E Bodden
(74) *Attorney, Agent, or Firm* — Trop, Pruner & Hu, P.C.

(57) ABSTRACT

Examples disclosed herein relate to security dominion of a computing device. A management controller of the computing device can access a physical owner token pertaining to a physical owner of the computing device. The management controller can access a security dominion owner token pertaining to a security dominion owner of the computing device. The security dominion owner token tracks accountability for a security feature of the computing device. A security dominion owner associated with the security dominion owner token is initially set to a first entity.

20 Claims, 3 Drawing Sheets

(56) References Cited

U.S. PATENT DOCUMENTS

2020/0259652 A1* 8/2020 Schmaltz, III ............ H04L 9/30
2020/0285559 A1   9/2020 Kuehnis et al.

OTHER PUBLICATIONS

Palmer et al., "Ownership and Control of Firmware in Open Compute Project Devices", IBM Corp, 2018, pp. 1-8.

* cited by examiner

```
500
```

- 502 AUTHENTICATE PHYSICAL OWNER
- 504 ENCRYPT PUBLIC KEY OF ANOTHER ENTITY USING PRIVATE KEY OF SECURITY DOMINION OWNER TOKEN TO CREATE TRANSFER TOKEN
- 506 PROVIDE TRANSFER TOKEN TO OTHER ENTITY
- 508 RECEIVE GRANTEE TOKEN INCLUDING PROOF OF ABILITY TO RECOVER NONCE FROM TRANSFER TOKEN

*FIG. 5*

$$T_o = E_{sk_o}(pk_e, N) \quad \text{(602)}$$

$$T_e = E_{sk_e}(T_o) \quad \text{(604)}$$

| Symbol | Description |
| --- | --- |
| E( ) | Asymmetric Encrypt function. |
| sk | Secret (private) key |
| pk | Public key |
| N | NONCE generated by the enclave |
| e | New security dominion owner |
| o | Current physical owner |

*FIG. 6*

SECURITY DOMINION OF COMPUTING DEVICE

BACKGROUND

Service providers and manufacturers are challenged to deliver quality and value to consumers, for example by providing computing devices with management controllers. Management controllers can be used to control management of various functionalities of computing devices such as servers. Firmware can be used on such management controllers.

BRIEF DESCRIPTION OF THE DRAWINGS

The following detailed description references the drawings, wherein:

FIG. 5 is a flowchart of a method for transferring security dominion ownership to another entity, according to an example:

FIG. 6 is a diagram showing an approach to transfer security dominion ownership to another entity, according to an example.

Figure 2:
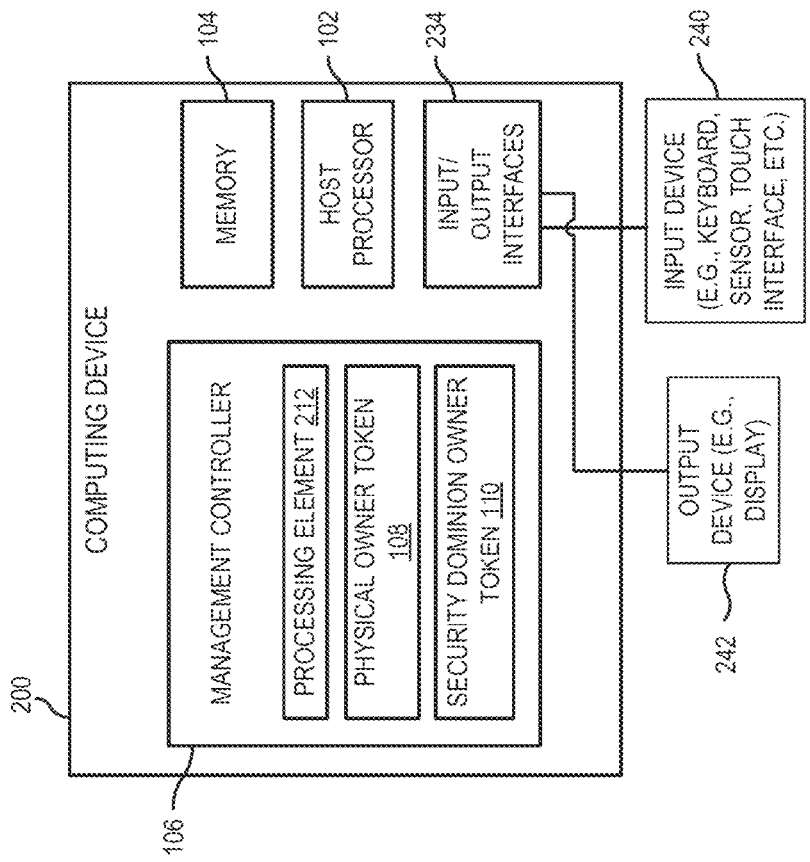
FIGS. 1 and 2 are block diagrams of computing devices with a management controller capable of accessing security dominion, according to various examples.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Customers of computing devices expect a computing device to be manageable, secure, and updateable. Many times, the manufacturer of the computing device provides firmware for components of the computing device to keep the computing device up to date and/or secure. In some examples, the computing device may include a management controller. The management controller may be used to manage the computing device. This may include monitoring health information about the computing device, performing updates, remote control of the computing device, or the like.

When a user buys a computing device, they look at the logo associated with the computing device and understand that a particular vendor stands behind the computing device. However, when a computing device has changed hands, the attesting to the computing device can become more complicated. For example, attesting to security of firmware being executed on the computing device may be dependent upon what happened to the firmware at a previous owner's location.

The management controller should be secure. One approach to ensuring security is to limit changes to the computing device's firmware to manufacturer signed software. However, some customers may wish to customize or change the firmware used on their computing devices. For example, a customer may wish to put firmware such as an open source firmware, a custom firmware, or a third party firmware on computing device components (e.g., the management controller). However, it is difficult for a manufacturer to attest to the security of the firmware on the computing device if it does not have control over the firmware. For example, if the firmware initially had a root of trust beginning with the management controller, replacing the firmware with firmware outside of the manufacturer's signed firmware would limit the ability of the manufacturer to attest to the security of the system because things may have been changed when the other firmware was installed. This can be important, for example, if the manufacturer refurbishes or repurposes a computing device or if the original owner resells the device. For example, a manufacturer may lease the computing device out to a customer for a number of years or may have a return or update program for customers. Computing devices that the manufacturer can attest to the security of may be more valuable than computing devices where the manufacturer cannot attest to the security of the computing device during a lifecycle. This may be because some customers would rather not use such devices or would value the ability for the manufacturer to attest to security.

Accordingly, various examples herein relate to an approach to allow transfer of security dominion of a computing device. The customer may be the initial physical owner of the computing device. As used herein, "security dominion" is a characterization about what entity is accountable for the security of the computing device's hardware. Example approaches described allow for it to be cryptographically irrefutable that: 1. Security dominion can only be transferred to the current physical owner; 2. Security dominion can only be assumed by the security dominion owner; 3. The current security dominion owner can be validated.

To implement the idea, tokens can be used. In one example, the tokens can include an "Owner token." As used herein, an owner token is a token that is based on a physical owner's private key. The private key is used to encrypt the grantee's public key and a NONCE. The physical owner's transfer token can be stored in a secure storage of the computing device. The secure storage may be implemented inside of the management controller (e.g., via an internal secure storage or secure enclave) or as part of an external secure storage. The tokens can also include a "security dominion owner token". The security dominion owner token is used to encrypt the Owner's token.

In some examples, a security enclave of a management controller can assume the role of a trusted agent and hold a transfer transaction in escrow until transfer of security dominion is complete. The enclave, or another entity can also maintain a ledgers of each transfer.

Figure 1:
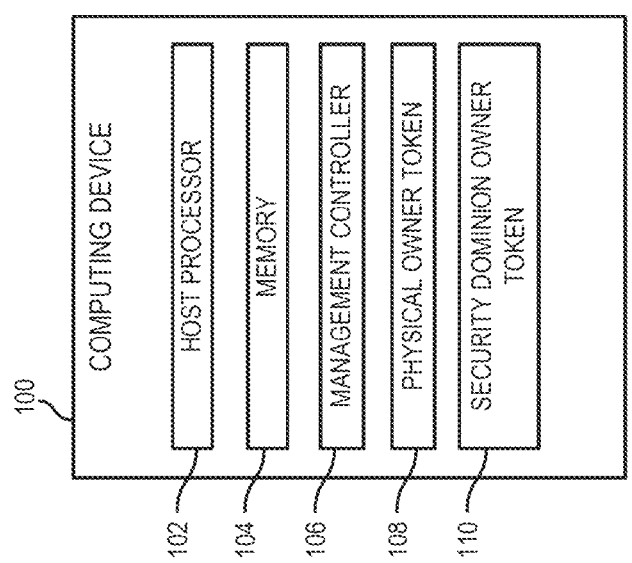

Referring now to the drawings, FIGS. 1 and 2 are block diagrams of computing devices with a management controller capable of accessing security dominion, according to various examples. Devices 100, 200 include components that can be utilized to track security dominion of a computing device. The respective devices 100, 200 may be a notebook computer, a desktop computer, a tablet computing device, a server, a workstation, or any other computing device that includes a management controller separate from a host processor to perform the tasks described.

Computing device 100 may include a host processor 102 and memory 104. The host processor 102 can include one or multiple physical processing components. When the computing device is turned on, the host processor 102 can execute platform firmware during a boot process and then turn over operating control of the computing device to a higher level operating system.

The computing device 100 may also include a management controller 106. The management controller, for example a baseboard management controller (BMC), has a separate chip from the host processor 102 and is implemented separately from the host processor 102. The management controller 106 can be powered by an auxiliary power rail. Further, the management controller 106 can include a processing element 212 that can execute instructions to perform approaches described herein.

When the computing device is powered, the management controller 106 can begin a validation sequence. The management controller 106 can be protected by a root of trust. The validation sequence can begin with the management controller 106 validating that its startup code is valid (e.g., by measuring the startup code and comparing the measurement to a previously taken value). The startup code can then measure additional portions of the code to run on the management controller 106. In one example, once the management controller 106 validates its code, it can then chain to validate other firmware. For example, the management controller 106 can validate firmware via one or more measurement of firmware memory, a Programmable Logic Device, a security co-processor, another component (e.g., an innovation engine or management engine), etc.

As used herein, a "Root of Trust device" or RoT device may be a device that behaves in an expected manner, as the RoT devices misbehavior may not be detectable. In other words, the RoT device may be inherently trusted software, hardware, or some combination thereof. A RoT device may include compute engines. A compute engine may be software operating using hardware in the RoT device, hardware of the RoT device, or some combination thereof. For example, a RoT device may include a Root of Trust for Storage (RTS). The RTS may be a compute engine capable of maintain an accurate summary of values. For example, the RoT may be implemented using a Trusted Platform Module (TPM). In such examples, the TPM may include a Platform Configuration Register (PCR) (or a plurality of PCRs). Further, the RTS may be a PCR (or a plurality of PCRs). In another example, the RoT may include a Root of Trust for Reporting (RTR). The RTR may be a compute engine capable of sending requested information to a requesting device. The information may include the contents in a register of the RoT (or the contents of the RTS) and information specified by the requester. The RoT may include other compute engines not described here, such as a compute engine to measure specified values or a compute engine to authenticate.

In the structure described above, the security features related to a chain of trust or validation sequence starts with control over the initial RoT and then validation of startup code. If that startup code or other components in the validation sequence is not controlled by a manufacturer, the manufacturer may not be able to attest to the security of the components.

Thus, approaches are described to allow another entity outside of the manufacturer attest to various security features of the computing device. Two tokens can be used for these approaches.

As noted, the computing device may include a physical owner token 108 and a security dominion owner token 110. As used herein, a "physical owner token" is a token that is based on a physical owner's private key.

Initially, the physical owner token 108 can be provisioned to a first owner of the computing device. In some cases this may be a manufacturer of the computing device. In other cases, this may be a first owner of the computing device. Further, the physical owner token 108 can be used to identify the owner and authenticate the owner for various tasks. A token is a data structure that includes at least a key that can be used for cryptographic activity. In one example, the token can be a certificate. In this example, the certificate may include a public key. The certificate can be used to prove ownership of the public key. In some examples, the certificate includes information about the public key, information about the owner of the key, and a digital signature of an entity that verified the certificate's contents.

As noted, a "security dominion owner token 110" can also be stored on the computing device 100, 200 (e.g., in a secure storage such as a secure storage of a management controller 106). As noted, the security dominion owner token pertains to a security dominion owner of the computing device 100, 200.

The security dominion owner token 110 tracks accountability for a security feature of the computing device 100, 200. In some examples, the security dominion owner token is initially set to a first entity. In some examples, the first entity can be a manufacturer of the computing device. As used herein, setting the security dominion owner token means to provision a public/private key set where the first entity owns the private key. As with the physical owner token 108, the security dominion owner token 110 can be implemented in the form of a certificate. The certificate can also include an identifier. This identifier may be used to identify the first entity (e.g., to display the first entity's name on a boot screen, send a notification about what the first entity is via a message of a BMC or an email, etc.). In one example, the security dominion owner's private key is used to control firmware updates. For example, the security dominion owner's private key can be used to sign firmware to be implemented on the computing platform.

In one example, the management controller 106 may be associated with a secure storage, a hardware root of trust, or other security features. In one example, on initial boot of the computing system 100, 200 into a service operating system (OS) or provisioning engine in a factory, a unique private and public key are generated and 'glued' onto the system by being saved into the management controller storage. This storage can be persistent and not replaceable. The management controller 106 may allow indirect access to a key using an application programming interface. The values can be written to a write once register on a same Application Specific Integrated Circuit (ASIC) as the management controller 106. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the management controller 106 can be used to ensure that firmware of the computing system 100, 200 is secure (e.g., by ensuring that firmware is not updated unless it is signed or encrypted using a public key that the private key of the management controller 106 can verify or decrypt. Further, in some examples, the management controller 106 can stop the computing system 100, 200 from booting with compromised firmware.

In some examples, the management controller 106 can load a boot loader for the management controller 106 that can self verify using its keys. After that, the management controller 106 can verify additional firmware, for example, firmware controlled by the security dominion owner's private key.

Moreover, in some examples, the management controller 106 can further include a key repository. As used herein, a key repository is a storage that includes at least one private key that can be used to verify that information has been signed by a public key. In some examples, the public key can also be included in the key repository. In some examples, a private key that is part of a root of trust can be considered a part of a key repository. Further, in some examples, the device unique data can be stored in the key repository.

In one example, the security feature is to verify a firmware update package to be implemented on the computing device 100, 200. In one example, the firmware update package is for the management controller 106. In another example, the firmware update package is for another controller or ASIC of the computing device 100, 200 (e.g., a keyboard controller, a network controller, a bus controller, platform firmware such as a basic input output system or an extensible firmware interface, an innovation engine, a management engine, a storage controller, a Programmable Logic Device or Field Programmable Gate Array, etc.). Implementation of the firmware package can take various forms, for example, updating firmware code on one or more of the ASICs or platform firmware and/or updating configuration settings for one or more of the ASICs or platform firmware.

A firmware update package can be received at the management controller 106. The firmware update package can come from a network device connected via a management network associated with the management controller 106 or another source, such as an operating system executing on a host processor 102 communicatively coupled to the management controller 106.

The management controller 106 can determine, based on the security dominion owner token, whether the firmware update package can be implemented on the computing device 100, 200. The determination can be based on one or more cryptographic keys.

In some examples, keys can be managed such that the security dominion owner token is used to authenticate firmware prior to installation of the firmware. In one example, the firmware is to be signed by a private key that can be verified by a key stored with the security dominion owner token 110. In another example, a key manager can be used. The computing device 100, 200 can include a key manager where the keys stored on the key manager are controlled using the security dominion owner token 110.

In one example, to add a key used for firmware authentication to a secure storage controlled by the key manager, the security dominion owner token 110 is required. In this example, prior to adding a key to the secure storage, an application programming interface (API) is used to verify that the adder of the key is in possession of the private key associated with the security dominion owner token.

In one example, the firmware update package is to update firmware of the management controller 106, which the management controller 106 can perform. In another example, the update is for another ASIC or firmware. In certain examples, the management controller 106 can permissions and capabilities to directly update the ASIC or firmware. In other examples, the management controller 106 can communicate with another authorized entity to update the firmware using the firmware package.

In some examples, the physical owner token 108 and/or the security dominion owner token 110 are stored in the same chip as the management controller 106. Further, in some examples, secure storage for keys may also be stored on the same chip. In other examples, another chip may be used for secure storage.

As noted above, the first entity can be a manufacturer of the computing device 100, 200. In other examples, the first entity can be the first owner of the computing device. Firmware updates associated with the manufacturer may be signed by the manufacturer using the manufacturers keys. The management controller 106 can verify that any firmware to be implemented is properly signed. Various approaches can be used for verifying signatures, for example, the X509 certificate standard, a Certificate Authority, etc.

In some examples, digital signatures are made using a two step process. The first step is to use a secure hashing algorithm on the data to be signed (e.g., the firmware package). The second step is to encrypt that hash result using a private signing key. The signature is to be verified by a public key, which can decrypt the hash, which can then be used to verify the firmware package. In the example here, the public key can be stored in the secure storage or as part of the security dominion owner token. In some examples, the secure storage can store multiple public keys, for example, some keys may be associated with the manufacturer and other keys may be associated with the entity in control of the security dominion owner token.

As noted, in one example, the manufacturer or other first entity is set. If a physical owner of the computing device 100, 200 would like to use firmware that is not signed by a private key associated with the manufacturer or other first entity, the physical owner can replace the security dominion owner token 110. In this example, the security dominion owner token is replaced with a second security dominion owner token. This can also set a second entity as the security dominion owner.

A secure approach can be used to replace the security dominion owner token. As noted above, in some examples, there can be certain properties used in the approach to transfer security dominion: 1. Security dominion can only be transferred to the current physical owner, 2. Security dominion can only be assumed by the security dominion owner; 3. The current security dominion owner can be validated.

In one example, to replace the security dominion owner token 110, the physical owner is authenticated by the management controller 106. In one example, a challenge-response authentication can be used. In one example, the approach can include cryptographic techniques.

Once the physical owner is authenticated, a private key of the security dominion owner token can be used to encrypt a public key of the second entity and a nonce to create a transfer token. A grantee token associated with the second entity is received and includes a proof of an ability to recover the nonce from the transfer token. A second security dominion owner token can be included in the grantee token and be used to replace the original security dominion owner token. As noted above, the security dominion owner token can include an identifier of the security dominion owner.

In this example, the identifier can identify a second entity. In some examples, the identifier can be provided to a user of the computing device 100, 200. The identifier can be provided, for example, as a graphic output to a display, for example to output device 242. In other examples, input/output interfaces 234 can be used to output a message with the security dominion owner's identifier. The message can be an email, a log message, or other message. In some examples, the message can be displayed as part of a management interface used to control the computing device 100, 200 from a management console.

A host processor 102, such as a central processing unit (CPU) or a microprocessor (e.g., management controller 106 with processing element 212) suitable for retrieval and execution of instructions and/or electronic circuits can be configured to perform various implementations described herein. In certain scenarios, instructions and/or other information, can be included in memory 232 or other memory. For example tokens and/or keys may be stored in a secure storage, an enclave, etc. Input/output interfaces 234 may additionally be provided by the computing device 200. For example, input devices 240, such as a keyboard, a sensor, a touch interface, a mouse, a microphone, etc. can be utilized to receive input from an environment surrounding the computing device 200. Further, an output device 242, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

In some examples, the management controller 106 can be used to implement services for the computing device 200. management controller 106 can be implemented using a separate processor from the processing element 130 that is used to execute a high level operating system. Management controller such as BMCs can provide so-called "lights-out" functionality for computing devices. The lights out functionality may allow a user, such as a systems administrator, to perform management operations on the computing device 200 even if an operating system is not installed or not functional on the computing device. Moreover, in one example, the management controller 106 can run on auxiliary power, thus the computing device 200 need not be powered on to an on state where control of the computing device 200 is handed over to an operating system after boot. As examples, the management controller 106 may provide so-called "out-of-band" services, such as remote console access, remote reboot and power management functionality, monitoring health of the system, access to system logs, and the like. As used herein, a management controller 106 has management capabilities for sub-systems of a computing device 200, and is separate from a processor or processing element 130 that executes a main operating system of a computing device (e.g., a server or set of servers).

As noted, in some instances, the management controller 106 may enable lights-out management of the computing device 200, which provides remote management access (e.g., system console access) regardless of whether the computing device 200 is powered on, whether a primary network subsystem hardware is functioning, or whether an OS is operating or even installed. The management controller 106 may comprise an interface, such as a network interface, and/or serial interface that an administrator can use to remotely communicate with the management controller 106. As used herein, an "out-of-band" service is a service provided by the management controller 106 via a dedicated management channel (e.g., the network interface or serial interface) and is available whether the computing device 200 is in powered on state.

In some examples, a management controller 106 may be included as part of an enclosure. In other examples, a management controller 106 may be included in one or more of the servers (e.g., as part of the management subsystem of the server) or connected via an interface (e.g., a peripheral interface). In some examples, sensors associated with the management controller 106 can measure internal physical variables such as humidity, temperature, power supply voltage, communications parameters, fan speeds, operating system functions, or the like. The management controller 106 may also be capable to reboot or power cycle the device. As noted, the management controller 106 allows for remote management of the device, as such, notifications can be made to a centralized station using the management controller 106 and passwords or other user entry can be implemented via the management controller 106.

Platform firmware can be implemented using instructions executable by a processor and/or logic. Platform firmware may include an interface such as a basic input/output system (BIOS) or unified extensible firmware interface (UEFI) to allow it to be interfaced with. The platform firmware can be located at an address space where a processing element such as host processor 102 (e.g., CPU) for the computing device 100, 200 boots. In some examples, the platform firmware may be responsible for a power on self-test for the computing device 100, 200. In other examples, the platform firmware can be responsible for the boot process and what, if any, operating system to load onto the computing device 100, 200. Further, the platform firmware may be capable to initialize various components of the computing device 100, 200 such as peripherals, memory devices 232, memory controller settings, storage controller settings, bus speeds, video card information, etc. In some examples, platform firmware can also be capable to perform various low level functionality while the computing device 100, 200 executes. Moreover, in some examples, platform firmware may be capable to communicate with a higher level operating system executing on a CPU, for example via an advanced configuration and power interface (ACPI). Further, as noted previously, platform firmware may be part of a chain of trust where each component loaded into memory is validated (e.g., via a measured or secure boot approach).

Figure 3:
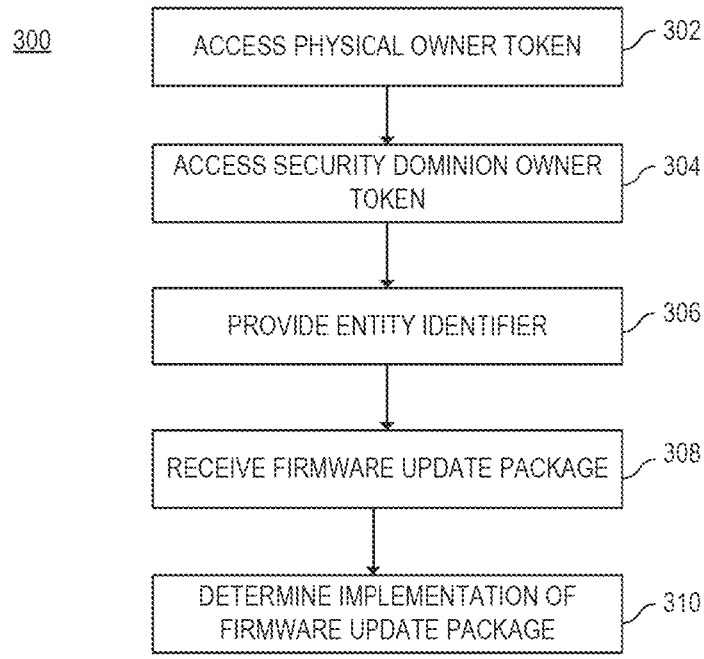
FIG. 3 is a flowchart of a method for determining implementation of firmware update package based on security dominion ownership, according to an example.
Figure 4:
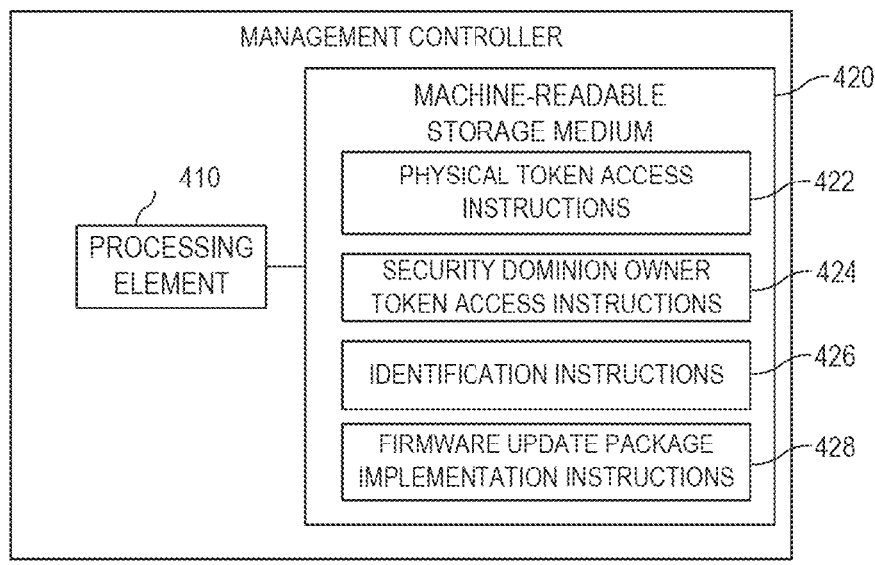
FIG. 4 is a block diagram of a management controller capable of accessing security dominion, according to an example.

FIG. 3 is a flowchart of a method for determining implementation of firmware update package based on security dominion ownership, according to an example. FIG. 4 is a block diagram of a management controller capable of accessing security dominion, according to an example.

The management controller 400 includes, for example, a processing element 410, and a machine-readable storage medium 420 including instructions 422, 424, 426, 428 for implementing security dominion on a computing device.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip. Processing element 410 may fetch, decode, and execute instructions 422, 424, 426, 428 to implement methods 300, 500. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426, 428.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for updating firmware based on a security dominion owner token and/or transferring security dominion of a computing device.

Although execution of method 300 is described below with reference to management controller 400, other suitable components for execution of method 300 can be utilized (e.g., computing device 100, 200). Additionally, the components for executing the method 300 may be spread among multiple devices. Method 300 may be implemented in the form of executable instructions stored on a machine-readable storage medium, such as storage medium 420, and/or in the form of electronic circuitry.

The management controller 400 may be in a state where an owner of the management controller 400 would wish to know the security dominion owner's identity. As noted above, the management controller 400 can be part of a computing device, where the management controller 400 is separate from a host processor or host processing element of the computing device.

At 302, the management controller may access the physical owner token pertaining to a physical owner of a device that the management controller 400 controls by executing physical token access instructions 422. In some examples, the management controller 400 may include a secure storage and an API that allows the management controller 400 to interact with the physical owner token. In other examples, the secure storage may be external to the management controller 400 and the secure storage can provide the API to the management controller 400.

At 304, the management controller 400 may access a security dominion owner token by executing security dominion owner token access instructions 424. As noted above, the security dominion owner token tracks accountability for a security feature of the computing device. The security dominion owner associated with the security dominion owner token can initially be set to a first entity. This can be performed using a provisioning activity that may be conducted at a manufacturing site by a manufacturer. In some examples, the manufacturer can be the first entity. As with the physical token, an API may be provided by the management controller 400 to access the security dominion owner token. In other examples, the secure storage may be external to the management controller 400 and the secure storage can provide the API to the management controller 400.

In one example, the management controller 400 can execute identification instructions 426 to request an identifier of the entity associated with the security dominion owner token (306). The identifier can then be provided by the management controller 400. The providing can be via a graphical user interface, a log, a message, an email, or other communication approach. As noted above, a purpose of the providing of the identifier is that the user knows who stands behind the security of the computing device. One reason for this is because the security dominion owner token is used for verifying firmware updates.

At 308, the management controller 400 receives a firmware update package to implement on the computing device. As noted above, the firmware update package can target the management controller or another ASIC or platform firmware. The management controller can communicate, via a serial communication or via a network communication with the provider of the firmware update package. The provider may be a computing device or user interface or a centralized management station for multiple computing devices. The firmware package can be signed, which can include a hash of the firmware package that is encrypted using a key.

At 310, firmware update package instructions 428 can be executed to determine whether to implement the firmware update package. This check can be a security feature that can be implemented by the management controller and is tied to the security dominion owner token. The management controller 400 can provide the hash to an API for verification and/or decryption. In one example, the security dominion owner token includes a key that can decrypt the hash. In another example, the security dominion owner token is used to access a key manager that includes the key that can decrypt the hash. In some examples, the signed firmware update package can include information about the encrypted hash, for example, the algorithm used to encrypt the hash, an algorithm used to measure the firmware update package to generate the hash, etc. The firmware update package can be verified if the firmware update package is measured and the hash generated from the measured firmware update package matches the decrypted hash. Other approaches can also be used for verification. In one example, if the firmware update package is verified, the firmware update package can be implemented on the computing device.

The management controller can execute firmware update package implementation instructions 428 to update the associated firmware. In one example, the management controller 400 is updated. In another example, another firmware or set of firmware is updated. The management controller 400 may be able to directly (e.g., via a bus or internal update) update one or more firmware or be able to send portions of the package to be updated via another entity (e.g., another controller or operating system). In this scenario, the management controller may provide proof of verification with the package.

FIG. 5 is a flowchart of a method for transferring security dominion ownership to another entity, according to an example. FIG. 6 is a diagram showing an approach to transfer security dominion ownership to another entity, according to an example. Method 500 may be implemented in the form of executable instructions stored on a machine-readable storage medium, such as storage medium 420, and/or in the form of electronic circuitry. Other devices, such as computing devices 100, 200 may also be able to perform the associated method 500.

As noted, in one example, the manufacturer or other first entity is set. If a physical owner of the computing device would like to use firmware that is not signed by a private key associated with the manufacturer or other first entity, the physical owner can replace the security dominion owner token. In this example, the security dominion owner token is replaced with a second security dominion owner token. This can also set a second entity as the security dominion owner.

A secure approach can be used to replace the security dominion owner token. As noted above, in some examples, there can be certain properties used in the approach to transfer security dominion: 1. Security dominion can only be transferred to the current physical owner; 2. Security dominion can only be assumed by the security dominion owner; 3. The current security dominion owner can be validated. FIG. 6 shows equations 602, 604 that show processes of how transfer tokens To and Te can be used to securely transfer security dominion ownership.

At 502, to replace the security dominion owner token, the physical owner is authenticated by the management controller 400. In one example, a challenge-response authentication can be used. In one example, the approach can include cryptographic techniques.

At 504, once the physical owner is authenticated, a private key of the security dominion owner token can be used to encrypt a public key of the second entity and a nonce to create a transfer token To. The nonce may be generated by a random number generator, an enclave, or other entity or functionality of the management controller.

At 506, the transfer token To is provided to the second entity. The second entity can encrypt the transfer token To with its private key. In some example, providing to the second entity can be to provide the token to a delegate of the second entity (e.g., an employee with a laptop, an administrator of a data center, etc.). In some examples, the physical owner is the second entity and would like to assume security domain ownership, for example, because the physical owner would like to put custom or open source firmware on the computing device. As such, physical access can be provided to the second entity. The second entity can then perform a cryptographic function on the transfer token To to create a security grantee token Te. The second entity can provide and the management controller can receive a grantee token including a proof of ability to recover the nonce from the transfer token 602 (508). Thus, a new security dominion owner token can be created. Transfer tokens can include a certificate with additional data, such as a public key of the security dominion owner token, information describing the security dominion owner, etc.

The management controller may include a ledger that tracks ownership status. In one example, during a secure boot or secure start process, the management controller can detect whether the signer of a firmware being implemented is different form Te or an authorized key. In another example, the ledger can create a record about any attempt to store To or Te. In a further example, the tracking can be based on local privacy laws, whether an unauthorized access was attempted, or the like.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A computing device comprising:
   at least one host processor;
   a secure storage;
   a memory;
   a management controller, separate from the at least one host processor, to:
     access a physical owner token pertaining to a physical owner of the computing device;
     access a security dominion owner token pertaining to a security dominion owner of the computing device, wherein the security dominion owner token tracks accountability for a security feature of the computing device, and a security dominion owner associated with the security dominion owner token is initially set to a first entity; and
     manage storage of a first key in the secure storage, wherein the managing comprises determining, by the management controller, that an adder of the first key possesses a private key associated with the security dominion token, and permitting, by the management controller, the first key to be stored in the secure storage responsive to the determination.

2. The computing device of claim 1, wherein the security feature relates to an ability to update a firmware of the computing device, and the management controller is further to:
   receive a firmware update package to be implemented;
   verify a signature associated with the firmware update package based on the first key; and
   based on a result of the verification, allow implementation of the firmware update package.

3. The computing device of claim 2, wherein the management controller to determine whether to permit the first key to be stored in the secure storage responsive to the management controller executing an application programming interface (API).

4. The computing device of claim 2, wherein the firmware update package is to update a firmware of the management controller.

5. The computing device of claim 1, wherein the physical owner token is stored in the secure storage, and the secure storage is included in a same chip as the management controller.

6. The computing device of claim 1,
   wherein the first entity is a manufacturer of the computing device, and
   wherein the security dominion owner token is replaced with a second security dominion owner token and sets a second entity as the security dominion owner.

7. The computing device of claim 6,
   wherein to replace the security dominion owner token:
     the physical owner is authenticated by the management controller;
     the private key is used to encrypt a public key of the second entity and a nonce to create a transfer token;
     a grantee token associated with the second entity is received and includes a proof of an ability to recover the nonce from the transfer token,
   wherein the second security dominion owner token is included with the grantee token.

8. The computing device of claim 7, further comprising, providing an identifier of the second entity to a user of the computing device.

9. A non-transitory machine-readable storage medium storing instructions that, if executed by a physical processing element of a management controller of a computing device, cause the management controller to:
access a physical owner token pertaining to a physical owner of the computing device, wherein the management controller is separate from a host processing element of the computing device wherein the security dominion owner token tracks accountability for a security feature of the computing device, and wherein a security dominion owner associated with the security dominion owner token is initially set to a first entity;
access a security dominion owner token pertaining to a security dominion owner of the computing device;
manage storage of a first key in a secure storage of the computing device, wherein the managing comprises determining, by the management controller, that an adder of the first key possesses a private key associated with the security dominion token, and permitting, by the management controller, the first key to be stored in the secure storage responsive to the determination; and
provide an identifier of the first entity of the computing device.

10. The non-transitory machine-readable storage medium of claim 9, further comprising instructions that, if executed by the physical processing element, cause the management controller to:
receive a firmware update package to be implemented, wherein the security feature relates to an ability to implement the firmware update package;
access the secure storage to access the first key; and
verify the firmware update package based on a signature of the firmware update package and the first key.

11. The non-transitory machine-readable storage medium of claim 9, wherein the security feature relates to an ability to implement a firmware update package, and the storage medium further comprising instructions that, if executed by the physical processing element, cause the management controller to:
communicate with an entity other than the management controller to implement the firmware update package.

12. The non-transitory machine-readable storage medium of claim 11, wherein the firmware update package is to update a firmware of the management controller.

13. The non-transitory machine-readable storage medium of claim 9, wherein the physical owner token is stored in the secure storage, and the secure storage is included in a same chip as the management controller.

14. The non-transitory machine-readable storage medium of claim 9,
wherein the first entity is a manufacturer of the computing device,
wherein the security dominion owner token is replaced with a second security dominion owner token and wherein the management controller is further to set a second entity as the security dominion owner, and
wherein the management controller is further to provide an identifier of the second entity.

15. The non-transitory machine-readable storage medium of claim 14,
wherein to replace the security dominion owner token:
the physical owner is authenticated by the management controller;
the private key is used to encrypt a public key of the second entity and a nonce to create a transfer token; and
a grantee token associated with the second entity is received and includes a proof of an ability to recover the nonce from the transfer token,
wherein the second security dominion owner token is included with the grantee token.

16. A method comprising:
accessing, by a management controller of a computing device, a physical owner token pertaining to a physical owner of the computing device, wherein the management controller is separate from a host processing element of the computing device;
accessing, by the management controller, a security dominion owner token pertaining to a security dominion owner of the computing device, wherein the security dominion owner token tracks accountability for a security feature of the computing device, a security dominion owner associated with the security dominion owner token is initially set to a first entity and the security feature relates an ability to implement a firmware update package;
managing storage of a first key in a secure storage of the computing device, wherein the managing comprises determining, by the management controller, that an adder of the first key possesses a private key associated with the security dominion token, and permitting, by the management controller, the first key to be stored in the secure storage responsive to the determination;
receiving the firmware update package;
verifying a signature associated with the firmware update package based on the first key;
based on a result of the verification, allowing implementation of the firmware update package; and
providing an identifier of the first entity of the computing device to a user.

17. The method of claim 16, wherein managing storage of the first key further comprises managing keys stored by a key manager of the management controller.

18. The method of claim 17, wherein the firmware update package is to update a firmware of the management controller, and the method further comprises storing the physical owner token in the secure storage.

19. The method of claim 16,
wherein the first entity is a manufacturer of the computing device,
wherein the security dominion owner token is replaced with a second security dominion owner token and wherein the management controller is further to set a second entity as the security dominion owner, and
wherein the management controller is further to provide an identifier of the second entity.

20. The method of claim 19,
wherein to replacing the security dominion owner token includes:
authenticating, by the management controller, the physical owner, wherein the private key is used to encrypt a public key of the second entity and a nonce to create a transfer token,
wherein a grantee token associated with the second entity is received and includes a proof of an ability to recover the nonce from the transfer token, and
wherein the second security dominion owner token is included with the grantee token.

* * * * *